United States Patent
Pintore et al.

(10) Patent No.: US 12,313,092 B2
(45) Date of Patent: May 27, 2025

(54) SYSTEMS AND METHODS FOR GROUPING HYDRAULIC FUNCTIONS FOR AN AGRICULTURAL IMPLEMENT

(71) Applicants: CNH Industrial Italia S.p.A., Turin (IT); CNH Industrial America LLC, New Holland, PA (US)

(72) Inventors: Francesco Pintore, Modena (IT); Stefano Fiorati, Ferrara (IT); Andrea Vacca, West Lafayette, IN (US); Xin Tian, Lisle, IL (US)

(73) Assignees: CNH Industrial America LLC, New Holland, PA (US); CNH Industrial Italia S.p.A., Turin (IT)

( * ) Notice: Subject to any disclaimer, the term of this patent is extended or adjusted under 35 U.S.C. 154(b) by 0 days.

(21) Appl. No.: 18/222,137

(22) Filed: Jul. 14, 2023

(65) Prior Publication Data
US 2025/0020146 A1    Jan. 16, 2025

(51) Int. Cl.
*F15B 11/17* (2006.01)
*E02F 9/22* (2006.01)
(Continued)

(52) U.S. Cl.
CPC .............. *F15B 11/17* (2013.01); *F15B 13/02* (2013.01); *E02F 9/2239* (2013.01); *F15B 11/163* (2013.01); *F15B 13/022* (2013.01)

(58) Field of Classification Search
CPC ....... E02F 9/2239; F15B 11/163; F15B 11/17; F15B 13/022
See application file for complete search history.

(56) References Cited

U.S. PATENT DOCUMENTS 3,774,641 A   11/1973  Mindner et al.
4,906,143 A   3/1990   Kussel et al.
(Continued)

FOREIGN PATENT DOCUMENTS

EP   1714847 B2   12/2013

OTHER PUBLICATIONS

Bing Xu et al. Research and Development of Electrohydraulic Control Valves Oriented to Industry 4.0: A Review Chinese Journal of Mechanical Engineering (2020) 33:29 Springer Open (20 pages) https://cjme.springeropen.com/track/pdf/10.1186/s10033-020-00446-2.pdf.

*Primary Examiner* — Matthew Wiblin
(74) *Attorney, Agent, or Firm* — Rickard K. DeMille; Rebecca L. Henkel; Peter K. Zacharias

(57) ABSTRACT

A method for grouping hydraulic functions associated with an agricultural implement includes accessing parameter data associated with hydraulic fluid used to drive a plurality of hydraulic functions of the implement, the hydraulic fluid being supplied from one of at least two pumps. The method also includes determining delivery pump pressures for the pumps for each of a plurality of different pump/function combinations based at least in part on the hydraulic parameter data and determining a power parameter requirement for the pumps for each of the different pump/function combinations based at least in part on the delivery pump pressures. In addition, the method includes selecting a desired pump/function combination based at least in part on the power parameter requirement, and controlling an operation of a plurality of switching valves such that the hydraulic fluid is supplied for driving the hydraulic functions in accordance with the desired pump/function combination.

19 Claims, 5 Drawing Sheets

(51) Int. Cl.
  *F15B 11/16* (2006.01)
  *F15B 13/02* (2006.01)

(56) References Cited

U.S. PATENT DOCUMENTS

| | | |
|---|---|---|
| 6,980,895 B2 | 12/2005 | Paice et al. |
| 10,161,423 B2 * | 12/2018 | Rampen ................ F15B 11/162 |
| 10,174,485 B2 | 1/2019 | Silber et al. |
| 10,294,629 B1 | 5/2019 | Sivaraman et al. |
| 10,813,269 B2 | 10/2020 | Blunier et al. |
| 10,820,491 B2 | 11/2020 | Kowalchuk |
| 11,071,246 B2 | 7/2021 | Turner et al. |
| 11,240,967 B2 | 2/2022 | Jones |
| 2006/0287792 A1 | 12/2006 | Jarrett |
| 2008/0257569 A1 | 10/2008 | Foster et al. |
| 2021/0356035 A1 | 11/2021 | Meid et al. |
| 2022/0061211 A1 | 3/2022 | Karst |
| 2022/0333620 A1 * | 10/2022 | Caldwell ............... F04B 1/0536 |
| 2023/0340968 A1 * | 10/2023 | Gappmaier ........... E02F 9/2225 |

* cited by examiner

SYSTEMS AND METHODS FOR GROUPING HYDRAULIC FUNCTIONS FOR AN AGRICULTURAL IMPLEMENT

FIELD OF THE INVENTION

The present subject matter relates generally to hydraulic systems for agricultural machines and, more particularly, to systems and methods for grouping hydraulic functions for an agricultural implement.

BACKGROUND OF THE INVENTION

Agricultural implements typically include various hydraulic components configured to execute a plurality of different hydraulic functions. For instance, for planting implements, hydraulic functions may be associated with the fertilizer system, compressor system, bulk fill fan system, hydraulic down pressure cylinder (HDPC) system, weight management cylinder (WMC) system, vacuum system, alternator system, and/or various other planter-related systems and sub-systems.

Typically, pressurized hydraulic fluid is supplied from a hydraulic sub-system of an associated work vehicle for driving the hydraulic functions of the implement. Conventionally, the hydraulic sub-system included a single pump for supplying the hydraulic fluid to the implement. However, as system requirements for the hydraulic functions of agricultural implements increase over time, these sub-systems were reconfigured to include a pair of supply pumps to increase the overall capacity and system efficiency. With such systems, each pump is configured to supply hydraulic fluid to drive a fixed set of hydraulic functions of the implement. In other words, conventional hydraulic systems have a predefined configuration for the connection between each pump and the hydraulic remote valves that are used to send hydraulic fluid to the implement. Accordingly, such arrangements are unlikely to be optimal for a given agricultural implement and fail to take into account the ever-changing system requirements of hydraulic systems during the performance of an agricultural operation (e.g., variation due to changes in operating conditions).

Accordingly, systems and methods for grouping hydraulic functions associated with an agricultural implement would be welcomed in the technology.

BRIEF DESCRIPTION OF THE INVENTION

Aspects and advantages of the invention will be set forth in part in the following description, or nay be obvious from the description, or may be learned through practice of the invention.

In one aspect, the present subject matter is directed to a method for grouping hydraulic functions associated with an agricultural implement. The method includes accessing, with a computing system, hydraulic parameter data associated with hydraulic fluid used to drive a plurality of hydraulic functions of the agricultural implement, the hydraulic fluid driving each hydraulic function of the plurality of hydraulic functions being supplied from one of at least two pumps. The method also includes determining, with the computing system, delivery pump pressures for the at least two pumps for each of a plurality of different pump/function combinations based at least in part on the hydraulic parameter data and determining, with the computing system, a power parameter requirement for the at least two pumps for each of the plurality of different pump/function combinations based at least in part on the delivery pump pressures. In addition, the method includes selecting, with the computing system, a desired pump/function combination of the plurality of different pump/function combinations based at least in part on the power parameter requirement; and controlling, with the computing system, an operation of a plurality of switching valves such that the hydraulic fluid is supplied for driving the plurality of hydraulic functions in accordance with the desired pump/function combination, wherein each of the plurality of switching valves is configured to control which of the at least two pumps supplies hydraulic fluid for driving a respective hydraulic function of the plurality of hydraulic functions.

In another aspect, the present subject matter is directed to a method for grouping hydraulic functions associated with agricultural implements. The method includes receiving, with a computing system, an input associated with performing an operation with an agricultural implement during which hydraulic fluid will be used to drive a plurality of hydraulic functions of the agricultural implement, the hydraulic fluid driving each hydraulic function of the plurality of hydraulic functions configured to be supplied from one of at least two pumps. In addition, the method includes selecting, with the computing system, a desired pump/function combination of a plurality of different pump/function combinations based at least in part on the input, and controlling, with the computing system, an operation of a plurality of switching valves such that the hydraulic fluid is configured to be supplied for driving the plurality of hydraulic functions in accordance with the desired pump/function combination, wherein each of the plurality of switching valves is configured to control which of the at least two pumps supplies hydraulic fluid for driving a respective hydraulic function of the plurality of hydraulic functions.

In a further aspect, the present subject matter is directed to a system for grouping hydraulic functions associated with agricultural implements. The system includes an agricultural implement configured to execute a plurality of hydraulic functions, and a work vehicle configured to tow the agricultural implement. The work vehicle supports a hydraulic sub-system including at least two pumps configured to supply pressurized hydraulic fluid and a plurality of valve assemblies, with each valve assembly of the plurality of valve assemblies being configured to regulate the supply of the pressurized hydraulic fluid used to drive a respective hydraulic function of the plurality of functions. The hydraulic sub-system further includes a plurality of switching valves, with each of the plurality of switching valves being configured to control which of the at least two pumps supplies hydraulic fluid to a respective assembly of the plurality of valve assemblies. The system also includes a computing system provided in association with at least one of the work vehicle or the agricultural implement. The computing system is configured to: access hydraulic parameter data associated with the hydraulic fluid used to drive the plurality of hydraulic functions of the agricultural implement; determine delivery pump pressures for the at least two pumps for each of a plurality of different pump/function combinations based at least in part on the hydraulic parameter data; determine a power parameter requirement for the at least two pumps for each of the plurality of different pump/function combinations based at least in part on the delivery pump pressures; select a desired pump/function combination of the plurality of different pump/function combinations based at least in part on the power parameter requirement; and control the operation of the plurality of switching valves such that the hydraulic fluid is supplied for driving the plurality of hydraulic functions in accordance with the desired pump/function combination.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
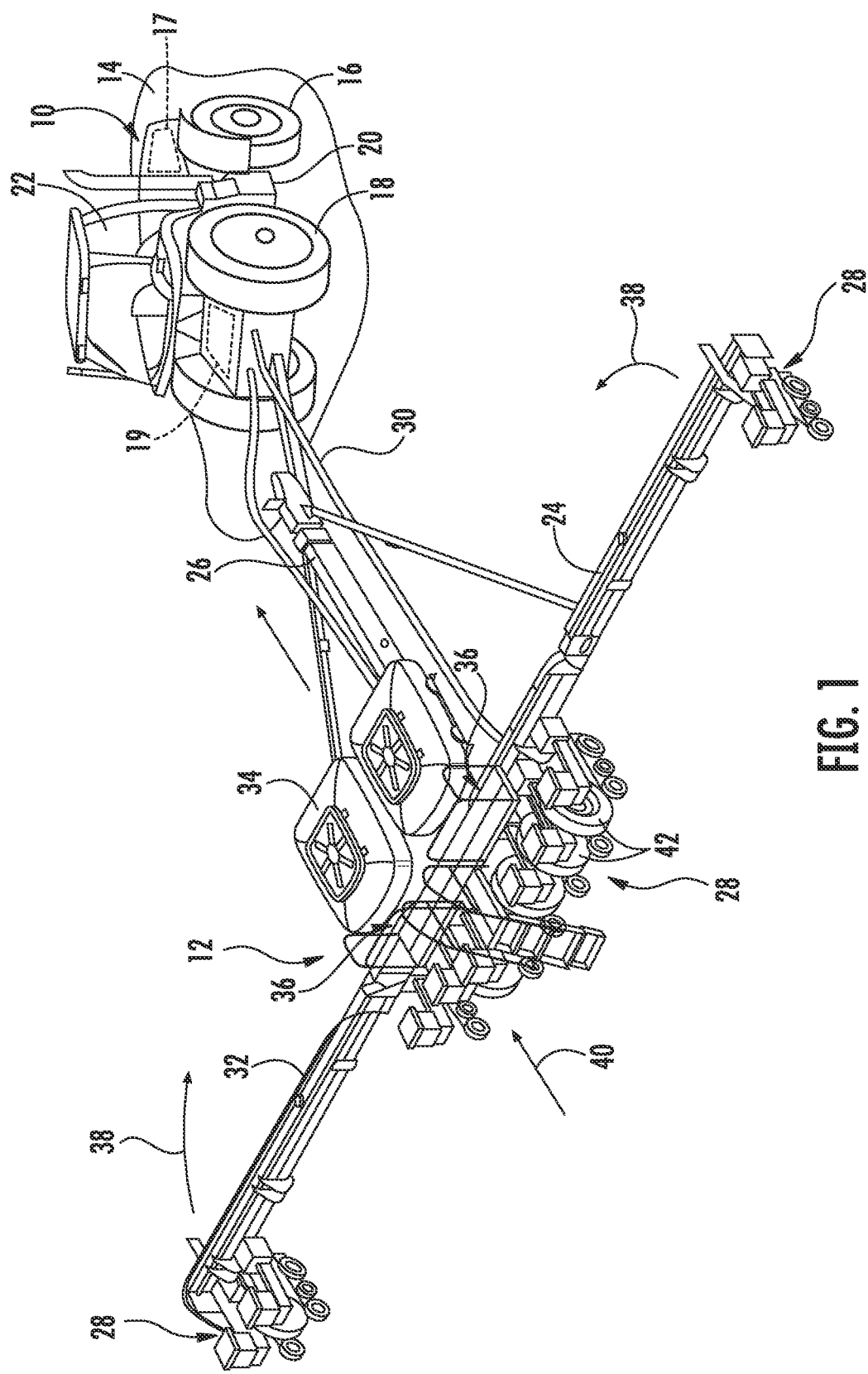
FIG. 1 illustrates a perspective view of one embodiment of a work vehicle towing an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for grouping hydraulic functions of an agricultural implement. In several embodiments, a computing system may be configured to identify the most efficient groupings or combinations of hydraulic functions of an agricultural implement to be supplied hydraulic fluid from two or more pumps of a hydraulic sub-system supported by a work vehicle towing the implement. The computing system may then be configured to actively control a plurality of switching valves of the sub-system and the associated pumps in accordance with such desired grouping or combination. Specifically, given the number of hydraulic functions of an agricultural implement, numerous different pump/function combinations can be achieved by varying which of the two or more pumps is supplying fluid to a respective set of hydraulic functions. In this regard, the computing system may be configured to assess or analyze the current hydraulic system requirements to identify or select the desired pump/function combination that maximizes the overall efficiency of the system.

Referring now to drawings, FIG. 1 illustrates a perspective view of one embodiment of a work vehicle 10 towing an agricultural implement 12 across the ground 14. As shown, the work vehicle 10 is configured as an agricultural tractor and the agricultural implement 12 is configured as a planter. However, in other embodiments, the work vehicle 10 may be configured as any other suitable agricultural vehicle and the agricultural implement 12 may be configured as any other suitable agricultural implement.

As shown in FIG. 1, the work vehicle 10 includes a pair of front wheels 16 (and associated front tires), a pair of rear wheels 18 (and associated rear tires) and a frame or chassis 20 coupled to and supported by the wheels. An operator's cab 22 may be supported by a portion of the chassis 20 and may house various input devices for permitting an operator to control the operation of one or more components of the work vehicle 10 and/or one or more components of the implement 12. Additionally, as is generally understood, the work vehicle 10 may include an engine 17 and a transmission 19 mounted on the chassis 20. The transmission 19 may be operably coupled to the engine 17 and may provide variably adjusted gear ratios for transferring engine power to the wheels 16, 18 via a drive axle assembly (or via axles if multiple drive axles are employed).

Additionally, as shown in FIG. 1, the implement 12 may include a laterally extending toolbar or frame assembly 24 connected at its middle to a forwardly extending tow bar 26. The frame assembly 24 may be supported by one or more wheels 42. The frame assembly 24 may generally be configured to support a plurality of seed planting units (or row units) 28. As is generally understood, each row unit 28 may be configured to deposit seeds at a desired depth beneath the soil surface and at a desired seed spacing as the implement 12 is being towed by the work vehicle 10, thereby establishing rows of planted seeds.

It should be appreciated that, for purposes of illustration, only a portion of the row units 28 of the implement 12 have been shown in FIG. 1. In general, the implement 12 may include any number of row units 28, such as 6, 8, 12, 16, 24, 32, or more row units. In addition, it should be appreciated that the lateral spacing between row units 28 may be selected based on the type of crop being planted and on the implement configuration. For example, the row units 28 may be spaced approximately 30 inches from one another for planting corn, and approximately 15 inches from one another for planting soybeans when the implement 12 is configured similar to the planter shown. Alternatively, if the implement 12 is configured as an air cart and an air seeder (not shown), the lateral spacing between rows of the air seeder may be a small as 6 inches, 9 inches, 10 inches, or 12 inches for seeding wheat, oats, barley, peas, canola, and/or the like.

In several embodiments, the work vehicle 10 may be configured to supply a working fluid, such as hydraulic fluid, to the implement 12 via one or more fluid lines 30. In such embodiments, the hydraulic fluid supplied from the work vehicle 10 may be delivered to one or more hydraulic components of the implement 12 (e.g., one or more hydraulic motors, hydraulic cylinders, etc.) for driving or operating one or more related hydraulic functions of the implement 12. For instance, when the implement 12 is configured as a planter, hydraulic functions may include or be associated with, for example, the fertilizer system, compressor system, bulk fill fan system, hydraulic down pressure cylinder (HDPC) system, weight management cylinder (WMC) system, vacuum system, alternator system, and/or various other planter-related systems and sub-systems. Thus, as an example, hydraulic fluid supplied to one or more hydraulic motors may drive a fan and/or a seed drive to direct agricultural material (e.g., seeds, fertilizer, and/or the like) along various supply lines 32 extending between the row units 28 and one or more associated tanks 34 of the implement 12.

Moreover, in several embodiments, the frame assembly 24 of the implement 12 may be adjustable. For instance, the frame assembly 24 may be configured to be folded upwardly from the working position or configuration shown in FIG. 1, in which the ground engaging tools (e.g., row units 28) are configured to engage the ground to perform a field operation, to a transport position or configuration (e.g., via rotation of, wings about joints 36) as indicated by arrows 38 in FIG. 1, in which the ground engaging tools are raised relative to the ground. Similarly, the frame assembly 24 may also be configured to be pivoted so as to align the frame assembly 24 with a direction of travel 40 of the work vehicle 10. Further, the frame assembly 24 may be configured to be raised from the working position to the transport position such that the distance between the frame assembly 24 and the ground increases between the working position and the transport position.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tracks in lieu of the tires 16, 18. For instance, the work vehicle 10 may correspond to a "fully tracked" work vehicle having tracks in lieu of both of its front and rear wheels or a "half-tracked" work vehicle having tracks in lieu of its front wheels or its rear wheels.

Similarly, it should also be appreciated that the configuration of the agricultural implement 12 described above and shown in FIG. 1 is only provided for exemplary purposes. Thus, it should be appreciated that the present subject matter may be readily adaptable to any manner of implement configuration or use. For instance, the agricultural implement 12 may instead be configured as a tillage implement, sprayer, seeder, and/or the like.

Figure 2:
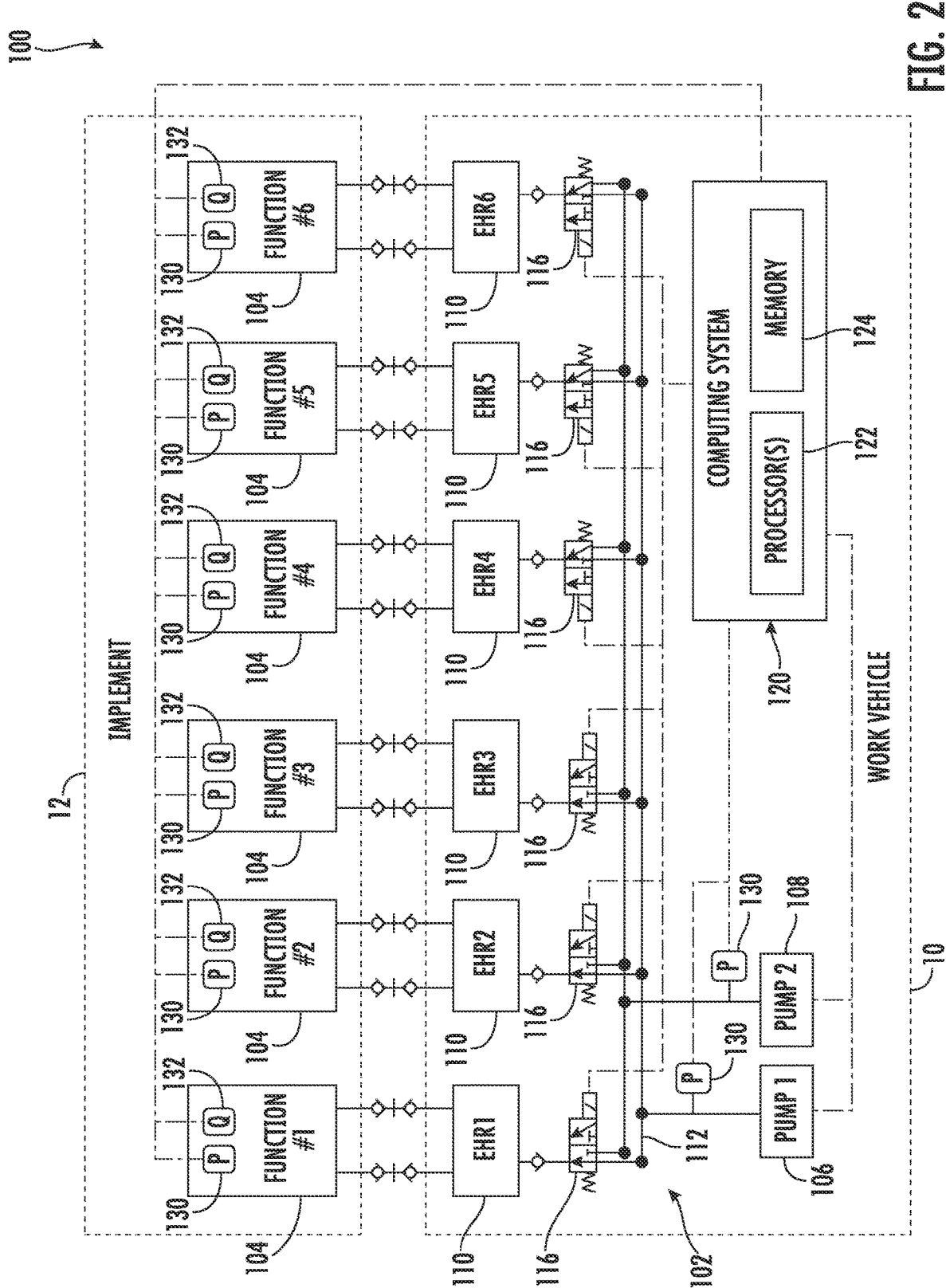
FIG. 2 illustrates a schematic view of one embodiment of a system for grouping hydraulic functions of an agricultural implement in accordance with aspects of the present subject matter.

Referring now to FIG. 2, a schematic view of one embodiment of a system 100 for grouping hydraulic functions associated with an agricultural implement is illustrated in accordance with aspects of the present subject matter. For purposes of discussion, the system 100 will generally be described herein with reference to the work vehicle 10 and implement 12 described above with reference to FIG. 1. However, it should be appreciated that the disclosed system 100 may be used with work vehicles having any other suitable vehicle configuration and with agricultural implements having any other suitable implement configuration. It should also be appreciated that, for proposes of illustration, hydraulic connections between components are shown in FIG. 2 using solid lines while electrical connections (or communicative links) between components are shown in FIG. 2 using dashed-phantom lines.

As shown in FIG. 2, the system 100 includes a hydraulic sub-system 102 supported on the work vehicle 10 for supplying pressurized hydraulic fluid to drive or operate a plurality of different hydraulic functions 104 of the agricultural implement 12. As indicated above, each hydraulic function 104 may be associated with one or more hydraulic components (e.g., one or more hydraulic motors, cylinders, and/or like) for performing a given function in association with the implement 12. For instance, suitable hydraulic functions for a planting implement may be associated with the fertilizer system, compressor system, bulk fill fan system, HDPC system, WMC system, vacuum system, alternator system, and/or various other planter-related systems and/or sub-systems. Of course, if the agricultural implement 12 is configured as a different type of implement (e.g., a tillage implement), the various hydraulic functions associated with the implement 12 may vary depending on the work to be performed within the field. In the illustrated embodiment, the agricultural implement 12 is shown as including six separate hydraulic functions 104 (e.g., Functions #1-#6). However, in the other embodiments, the implement 12 may be associated with any other number of hydraulic functions 104, such as five or fewer hydraulic functions or seven or more hydraulic functions.

In several embodiments, the hydraulic sub-system 102 supported on the work vehicle 10 includes two or more pumps (e.g., first and second pumps 106, 108) configured to supply pressurized hydraulic fluid to a plurality of valve assemblies 110 (e.g., a plurality of electro-hydraulic remote (EHR) valve assemblies), with each valve assembly 110 being configured, in turn, to regulate the supply of pressurized hydraulic fluid to a respective hydraulic function 104 of the implement 12. Specifically, in the illustrated embodiment, the hydraulic sub-system 102 is shown as including six separate valve assemblies 110 (e.g., EHR1-EHR6) for controlling the supply of hydraulic fluid used to drive or operate the six different hydraulic functions 104 of the implement 12. However, the hydraulic sub-system 102 may, for example, include more or less valve assemblies 110. Similarly, in the illustrated embodiment, the hydraulic sub-system 102 is shown as including two pumps 106, 108 for supplying hydraulic fluid. However, in other embodiments, the system may include three or more pumps.

As shown in FIG. 2, the first pump 106 is configured to provide pressurized hydraulic fluid through a first supply line 112 while the second pump 108 is configured to provide pressurized hydraulic fluid through a second supply line 114. In accordance with aspects of the present subject matter, each valve assembly 110 is fluidly coupled to the first and second supply lines 112, 114 via a respective switching valve 116, thereby allowing each switching valve 116 to be used to regulate which pump is supplying fluid to the respective valve assembly 110 (and, thus, the respective hydraulic function 104 fluidly coupled to such valve assembly 110). For instance, in one embodiment, each switching valve 116 may correspond to an electronically-activated (e.g., solenoid-activated), two-position valve. In such an embodiment, when a given switching valve 16 is at its neutral position, pressurized fluid from one of the pumps 106, 108 may be supplied to the associated valve assembly 110, and, when the switching valve 16 is actuated to its other position, pressurized fluid from the other pump 106, 108 may be supplied to the associated valve assembly 110. For instance, in the illustrated embodiment, the switching valves 116 associated with the first three valve assemblies 110 (EHR1, EHR2, EHR3) are configured such that, at their neutral positions, the respective valve assemblies 110 are configured to receive pressurized fluid from the first pump 106 via supply line 112. In such an embodiment, to switch the pump supply for such valve assemblies 110 (EHR1, EHR2, EHR3), the respective switching valves 116 may be actuated to their secondary or opposed positions to allow pressurized fluid to be supplied to the valve assemblies 110 (EHR1, EHR2, EHR3) from the second pump 108 via supply line 114. Similarly, in the illustrated embodiment, the switching valves 116 associated with the remaining three valve assemblies 110 (EHR4, EHR5. EHR6) are configured such that, at their neutral positions, the respective valve assemblies 110 are configured to receive pressurized fluid from the second pump 108 via supply line 114. In such an embodiment, to switch the pump supply for such valve assemblies 110 (EHR4, EHR5, EHR6), the respective switching valves 116 may be actuated to their secondary or opposed positions to allow pressurized fluid to be supplied to the valve assemblies 110 (EHR4, EHR5, EHR6) from the first pump 106 via supply line 112. In one embodiment, the configuration of the various switching valves 116 may be selected such that, when the valves 116 are at their neutral positions, the hydraulic circuit arrangement matches a predefined or predetermined circuit arrangement for the work vehicle 10.

It should be appreciated that, in the illustrated embodiment, the switching valves 116 comprise two-position, directional control valves to allow the pump supply to be switched between the pumps 106, 108. In an embodiment including three pumps (or four or more pumps), the switching valves 116 may, for example, comprise three-position (or other multi-position), directional control valves or any other suitable valves.

The system 100 may also include a computing system 120 configured to execute various computer-implemented functions. In general, the computing system 120 may comprise any suitable processor-based device known in the art, such as a computing device or any suitable combination of computing devices. Thus, in several embodiments, the computing system 120 may include one or more processor(s) 122 and associated memory device(s) 124 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 124 of the computing system 120 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optic-al disk (MOD), a digital versatile disc (DVD) and/or other suitable memory elements. Such memory device(s) 124 may generally be configured to store suitable computer-readable instructions that, when implemented by the processor(s) 122, configure the computing system 120 to perform various computer-implemented functions, such as one or more aspects of the methods or algorithms described herein. In addition, the computing system 120 may also include various other suitable components, such as a communications circuit or module, one or more input/output channels, a data/control bus and/or the like.

It should be appreciated that the computing system 120 may correspond to an existing computing system of the work vehicle 10 and/or implement 12 or the computing system 120 may correspond to a separate computing system. For instance, in one embodiment, the computing system 120 may form all or part of a separate plug-in module that may be installed in association with the work vehicle 10 and/or implement 12 to allow for the disclosed system 100 and related methods to be implemented without requiring additional software to be uploaded onto existing computing systems of the work vehicle 10 and/or implement 12.

In accordance with aspects of the present subject matter, the computing system 120 may be configured to identify the most efficient groupings or combinations of hydraulic functions 104 to be supplied hydraulic fluid from each of the pumps 106, 108 and then actively control the switching valves 116 and pumps 106, 108 in accordance with such desired grouping or combination. Specifically, given the number of hydraulic functions 104 (e.g., six functions in the illustrated embodiment), numerous different pump/function combinations can be achieved by varying which pump 106, 108 is supplying fluid to a respective set of hydraulic functions 104. In this regard, the computing system 120 may be configured to assess or analyze the current hydraulic system requirements to identify or select the desired pump/function combination (e.g., a given set of hydraulic functions, ranging from zero to six functions, supplied by the first pump 106, with the remainder supplied by the second pump 108) that maximizes the overall efficiency of the system 100. Additionally, the computing system 120 may be configured to continually re-assess the current hydraulic system requirements to allow the desired pump/function combination to be updated or switched, as necessary, as changes occur during operation within the field. For instance, in one embodiment, the computing system 120 may be configured to re-assess the current hydraulic system requirements at a predetermined frequency (e.g., every 5 seconds) to determine if the previously implemented pump/function combination needs to be adjusted based on changing system requirements.

To assess the current hydraulic system requirements, the computing system may be configured to access hydraulic parameter data associated with the hydraulic fluid being supplied from the pumps to drive the various hydraulic functions 104 of the implement 12. Specifically, in several embodiments, the computing system 120 may be configured to access data associated with the pressure and flow rate of the hydraulic fluid being supplied to drive the various hydraulic functions 104. In one embodiment, such data may be received from a plurality of different sensors 130, 132 provided in association with the components facilitating the hydraulic functions 104 and/or the hydraulic sub-system 102. For instance, as shown in FIG. 2, each hydraulic function 104 is associated with one or more pressure sensors 130 and one or more flow rate sensors 132 for monitoring one or more pressures (e.g., a supply pressure to the associated hydraulic component(s) and/or an internal working pressure for the associated hydraulic component(s)) and one or more flow rates (e.g., an input rate to the associated hydraulic component(s)) for the hydraulic function 104. Similarly, as shown in FIG. 2, a pressure sensor 130 may be provided in association with each supply line 112, 114 to provide pressure data associated with the output or delivery pressures of the respective pumps 106, 108. It should be appreciated that, as an alternative to actively sensing the system pressures and/or flow rates, one or more of the pressures and/or flow rates within the system 100 may be estimated or calculated based on other sensed, calculated, or known parameters/variables. Thus, it should be appreciated that the computing system 120 may be configured to "access" hydraulic parameter data in a variety of different ways, including directly monitoring system pressures and flow rates via received sensor data and/or indirectly monitoring system pressures and flow rates using other data.

As shown in FIG. 2, the computing system 120 is communicatively coupled to the various sensors 130, 132 via suitable electrical connections or communicative links, thereby allowing sensor data generated by the sensors 130, 132 to be transmitted to the computing system 120 for subsequent storage, processing, and analysis. Similarly, as shown in FIG. 2, the computing system 120 is communicatively coupled to the switching valves 116 and pumps 106, 108 via suitable electrical connections or communicative links, thereby allowing the computing system 120 to actively control the operation of such components. Additionally, although not shown in FIG. 2, the computing system 120 may also be communicatively coupled to the valve assemblies 110 via suitable electrical connections or communicative links to allow the computing system 120 to actively control the operation of such assemblies 110.

Figure 3:
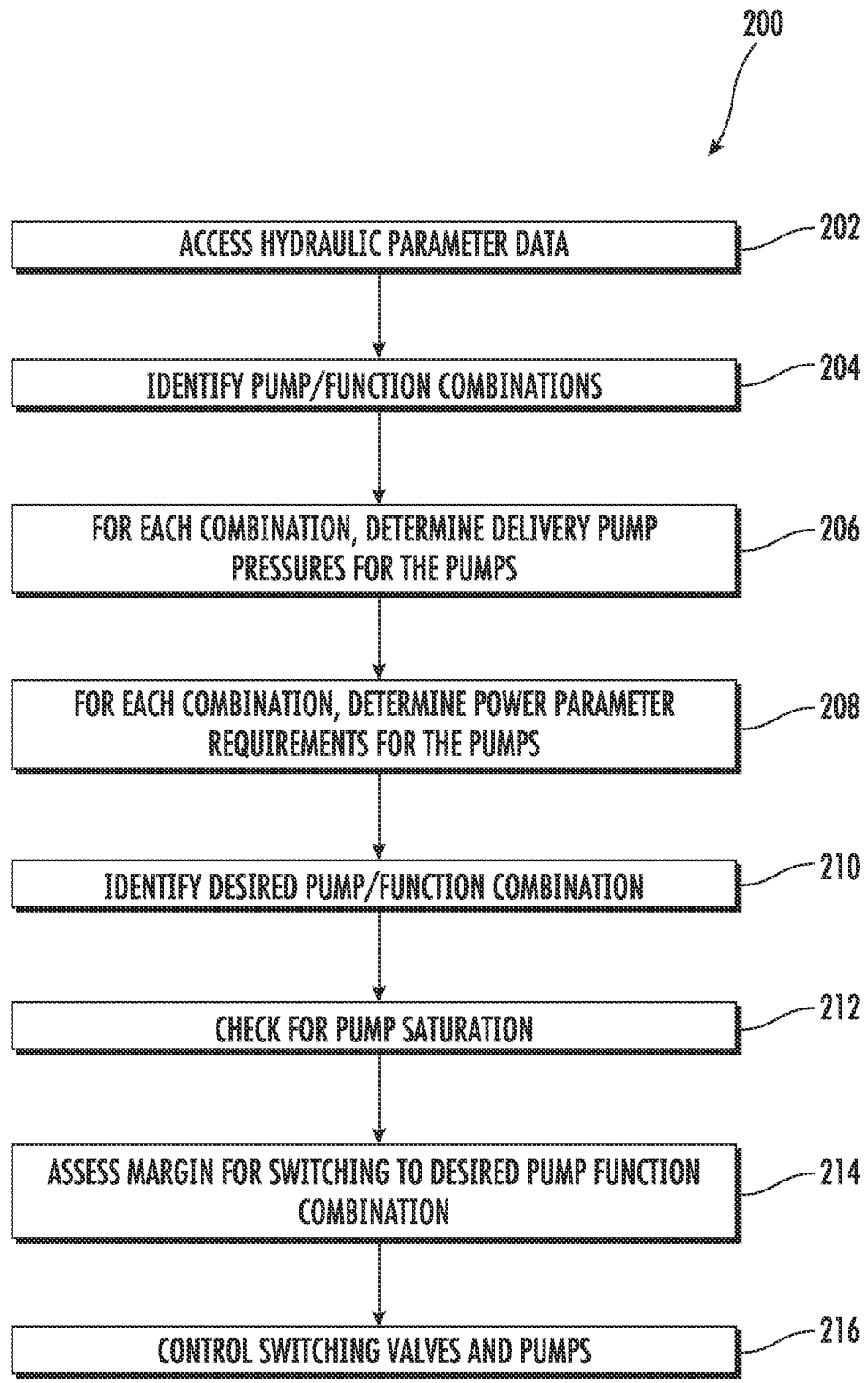
FIG. 3 illustrates a flow diagram of one embodiment of a method for grouping hydraulic functions of an agricultural implement in accordance with aspects of the present subject matter.

Referring now to FIG. 3, a flow diagram of one embodiment of a method 200 for automatically grouping hydraulic functions associated with an agricultural implement is illustrated in accordance with aspects of the present subject matter. In general, the method 200 will be described herein with reference to the system 100 described above with reference to FIG. 2. However, it should be appreciated by those of ordinary skill in the art that the disclosed method 200 may be implemented in association with any other system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, as (202), the method 200 includes accessing hydraulic parameter data associated with the hydraulic fluid being supplied for driving the various hydraulic functions of an agricultural implement. For instance, as indicated above, sensor data associated with system pressures and flow rates may be received from various sensors 130, 132, thereby providing the computing system 120 with access to such data. Alternatively, the computing system 120 may be configured to estimate or calculate system pressures and flow rates using other data (e.g., sensed, calculated, or known data associated with other system parameters/variables), thereby providing the computing system 120 with access to such hydraulic parameter data. In one embodiment, the computing system 120 may be configured to access the hydraulic parameter data at a given frequency (e.g., at a given sampling rate, such as every 0.5 seconds), thereby allowing the computing system 120 to actively monitor the current hydraulic requirements across the system 100.

At (204), the computing system 120 may be configured to identify the various possible pump/function combinations available given the configuration of the associated system 100. For instance, based on the number of supply pumps 106, 108 included within the hydraulic sub-system 102 supported on the work vehicle 10 and the number of hydraulic functions 104 supported on the implement 12, numerous different pump/function combinations may be achieved. Such various different pump/function combinations may, in one embodiment, be stored within the memory 124 of the computing system 120 (e.g., as a look-up table or other data table).

As an example, given the configuration shown in FIG. 2 (i.e., two supply pumps 106, 108 and six hydraulic functions 104), sixty-four different pump/function combinations may be achieved. Such various pump/function combinations are shown below in Table 1. As shown, by splitting the hydraulic functions 104 into two groups based on which pump 106, 108 is supplying fluid to each group (i.e., Group A supplied by the first pump 106 and Group B supplied by the second pump 108), the various pump/function combinations can be identified. For instance, two different pump/function combinations can be defined in which all of the hydraulic functions 104 are supplied by one of the pumps 106, 108 (e.g., six functions supplied by the first pump 106 or second pump 108 and no functions supplied by the other pump). Similarly, twelve different pump/function combinations can be defined in which one of the hydraulic functions 104 is supplied by one of the pumps 106, 108 and the remaining hydraulic functions 104 (e.g., five in total) are supplied by the other pump, while thirty different pump/function combinations can be defined in which two of the hydraulic functions 104 are supplied by one of the pumps 106, 108 and the remaining hydraulic functions 104 (e.g., four in total) are supplied by the other pump. Additionally, another twenty different pump/function combinations can be defined in which three of the hydraulic functions 104 are supplied by each of the pumps 106, 108.

TABLE 1

Exemplary Set of Pump/Function Combinations

| # | Groups - Pump Supplying Fluid | Pump/Function Combinations |
| --- | --- | --- |
| 1 | Group A supplied by First Pump | 0 functions in Group A, 6 functions in Group B: i.e., [—, 123456] |
| 2-7 | Group B supplied by Second Pump | 1 function in Group A, 5 functions in Group B: i.e., [1, 23456 . . . ] |
| 8-22 | | 2 functions in Group A, 4 functions in Group B: i.e., [12, 3456 . . . ] |
| 23-42 | | 3 functions in Group A, 3 functions in Group B: i.e., [123, 456 . . . ] |
| 43-57 | | 4 functions in Group A, 2 functions in Group B: i.e., [1234, 56 . . . ] |
| 58-63 | | 5 functions in Group A, 1 function in Group B: i.e., [12345, 6 . . . ] |
| 64 | | 6 functions in Group A, 0 functions in Group B: i.e., [123456, —] |

It should be appreciated that, with the above-described groupings, the first and second pumps 106, 108 are considered separate power sources with separate power requirements. Specifically, in many instances, the pumps 106, 108 will have different configurations (e.g., different types, sizes, capacities, etc.) and/or different efficiency profiles, thereby having differing power or torque requirements to achieve given system requirements. In such instances, the pumps 106, 108 are treated separately when creating the various pump/function combinations.

Referring still to FIG. 3, at (206), the method 200 includes determining delivery pump pressures for the pumps for each potential pump/function combination. Specifically, based the current hydraulic parameter data for the system 100 (e.g., the current system pressures and flow rates), the computing system 120 may be configured to calculate the required delivery pump pressures for the pumps 106, 108 for each potential pump/function combination. An example flow diagram 300 for calculating the delivery pump pressures required for each potential pump/function combination is illustrated in FIG. 4.

Figure 4:
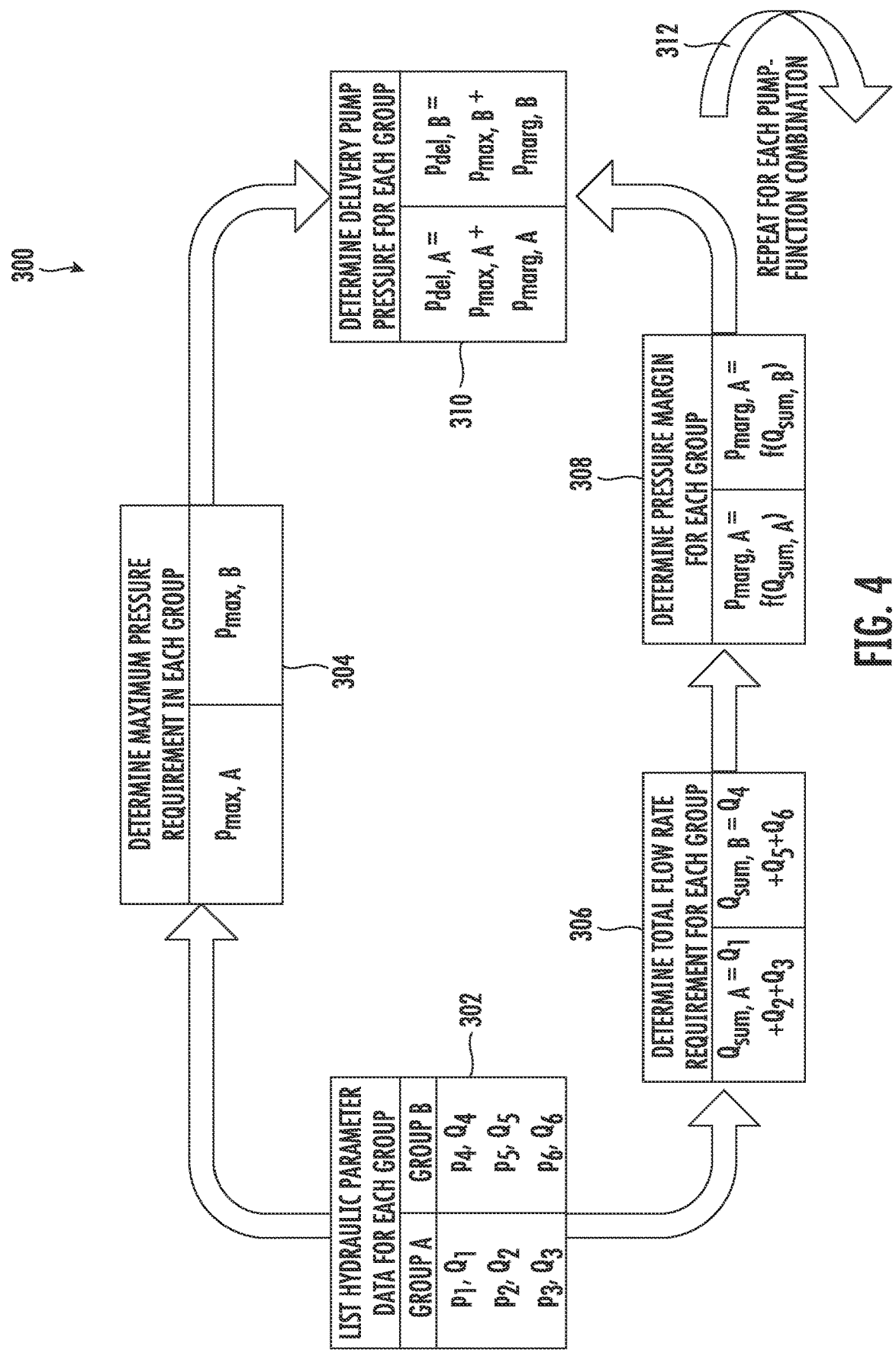
FIG. 4 illustrates an exemplary flow diagram for determining delivery pump pressures associated with potential pump/function combinations in accordance with aspects of the present subject matter.

Referring briefly to FIG. 4, at (302), the current hydraulic parameter data (e.g., pressure data ($p_i$) and flow rate data ($Q_i$)) can be accessed or obtained for the various hydraulic functions 104 and then split into separate groups (e.g., Group A and Group B) based on the specific pump/function combination being assessed at the time. For instance, in the example shown in FIG. 2, the pump/function combination being analyzed requires that Group A (i.e., the group supplied by the first pump 106) include the first three hydraulic functions 104 (i.e., Functions #1-#3) and Group B (i.e., the group supplied by the second pump 108) include the remaining hydraulic functions 104 (i.e., Functions #4-#6). In such instance, the current pressure data ($p_i$) and current flow rate data ($Q_i$) for the first three hydraulic functions (i.e., Functions #1-#3) can be tabulated for Group A, while the current pressure data ($p_i$) and current flow rate data ($Q_i$) for the remaining hydraulic functions (i.e., Functions #4-#6) can be tabulated for Group B.

At (304), the different groups within the pump/function combination being assessed can be analyzed to determine the maximum pressure requirement for each group. Specifically, using the current pressure data for the system 100, the computing system 120 can analyze the various hydraulic functions 104 included within Group A and identify the largest pressure ($p_i$) across such functions as the maximum pressure ($p_{max,A}$) for that group. Similarly, the computing system 120 can analyze the various hydraulic functions 104 included within Group B and identify the largest pressure ($p_i$) across such functions as the maximum pressure ($p_{max,B}$) for that group. It should be appreciated that the maximum pressure for a group may be equal to zero in instances in which such group is not associated with any hydraulic functions 104 (i.e., when all of the hydraulic functions 104 are being driven by hydraulic fluid supplied from the pump associated with the other group).

Additionally, at (306), the different groups within the pump/function combination being assessed can be analyzed to determine the total flow rate requirement each group. Specifically, using the current flow rate data for the system 100, the computing system 120 can sum the individual flow rates associated with the hydraulic functions 104 included within Group A to calculate the total flow rate requirement ($Q_{sum,A}$) for that group. Similarly, the computing system 120 can sum the individual flow rates associated with the hydraulic functions 104 included within Group B to calculate the total flow rate requirement ($Q_{sum,B}$) for that group. It should be appreciated that the total flow rate requirement for a group may be equal to zero in instances in which such group is not associated with any hydraulic functions 104 (i.e., when all of the hydraulic functions 104 are being driven by hydraulic fluid supplied from the pump associated with the other group).

At (308), a pressure margin may be calculated for each group as a function of the group's total flow rate requirement. Specifically, based on the total flow rate requirement for each group, a pressure margin may be calculated or determined to provide an acceptable or desired operating margin within the system 100 (e.g., a first pressure margin, $P_{marg,A}$, for the first pump 106 anti a second pressure margin, $P_{marg,B}$, for the second pump 108). For instance, the desired pressure margin may take into account losses within the system 100, such as the throttling losses occurring across the various hydraulic supply lines. In one embodiment, the computing system 120 may be provided with a look-up table that maps pressure margins to associated flow rate requirements for each pump 106, 108, thereby allowing the computing system 10 to select a corresponding pressure margin for each pump 106, 108 given the current flow rate requirement for its associated group. Alternatively, the pressure margin for each pump 106, 108 may be dynamically calculated based on sensed, calculated, and/or known system parameters/variables. It should be appreciated that suitable experimentation and/or modeling may be performed to calculate or estimate system losses across the hydraulic system, thereby allowing the pressure margins to be established or calculated by the computing system 120 based on suitable data tables and/or algorithms/models correlating the margins to the flow rate requirements and other potential system parameters/variables (e.g., hydraulic fluid temperatures, etc.).

At (310), the delivery pump pressure for each group may then be determined based on the maximum pressure requirement for such group along with the pressure margin identified for the associated pump. Specifically, as shown in FIG. 4, the delivery pump pressure for the first pump 106 ($p_{del,A}$) can be calculated by summing the maximum pressure requirement for Group A ($p_{max,a}$) with the desired pressure margin for the first pump 106 ($P_{marg,A}$) as determined based on the total flow requirement ($Q_{sum,A}$) for Grout) A. Similarly, the desired delivery pump pressure for the second pump 108 ($p_{del,B}$) can be calculated by summing the maximum pressure requirement for Group A ($p_{max,B}$) with the desired pressure margin for the second pump 108 ($P_{marg,B}$) as determined based on the total flow requirement ($Q_{sum,B}$) for Group B. The delivery pump pressures for the pumps 106, 108 may then be stored within the memory 124 of the computing system 120 in association with the specific pump/function combination being analyzed, such as by storing the delivery pump pressures in a look-table in association with an ID number for the corresponding pump/function combination.

It should be appreciated that, as indicated by arrow 312 in FIG. 4, the process (302-310) may be repeated to determine the delivery pump pressures for each pump-function combination. For instance, referring to Table 1 above, the method flow shown in FIG. 4 may be repeated sixty-four times to establish delivery pump pressures for the first and second pumps 106, 108 for each of the sixty-four different pump-function combinations.

Referring back to FIG. 3, following the determination of the delivery pump pressures, the method 200 may, at (208), include determining power parameter requirements for the pumps for each potential pump/function combinations. Specifically, based on the delivery pump pressure and total flow rate requirement for each group, the computing system 120 may be configured to calculate or determine power parameter requirements for the pumps 106, 108 for each potential pump/function combination. Suitable power parameter requirements may include, for example, shaft power requirements for each pump and/or torque requirements. For instance, in one embodiment, the computing system 120 may be configured to utilize the following relationships (e.g. Equations 1 and 2) to calculate the anticipated torque requirement for each pump 106, 108:

$$Q_{sum} = \alpha * V_{max} * \eta_{voi} \quad (1)$$

$$T_{actual} = \alpha * V_{max} * (p_{aei} - p_{in}) \quad (2)$$

wherein, $Q_{sum}$ is the total flow rate requirement for the group (i.e., as calculated at 306 in FIG. 4), a is the fractional pump displacement (i.e., as calculated using Equation 1), $V_{f}ax$ is the pump maximum displacement (i.e., a known value that is pre-stored within the memory 124 of the computing system 120), $\eta_{voi}$ is the pump volumetric efficiency (i.e., a know % n value that is pre-stored within the memory 124 of the computing system 120), $T_{actual}$ is the torque requirement for the pump 106, 108 (i.e., as calculated using Equation 2), $p_{del}$ is the delivery pump pressure for the pump 106, 108 (i.e., as calculated at 310 in FIG. 4), and $p_{in}$ is the input pressure to the pump 106, 108 (i.e. as measured via a pressure sensor or as input as a fixed value).

Based on the equations above, the computing system 120 can calculate, for each pump/function combination, the fractional pump displacement ($\alpha$) for each pump 106, 108 using Equation 1. Thereafter, using the fractional pump displacement ($\alpha$) from Equation 1, the computing system 120 can calculate the torque requirement ($T_{actual}$) for each pump 106, 108 using Equation 2. The torque requirements for the pumps 106, 108 for a given pump/function combination may then be summed to determine the total anticipated torque requirement for such pump/function combination using the relationship below (Equation 3):

$$T_{total} = T_{actual,A} + T_{actual,B} \quad (3)$$

wherein, $T_{total}$ is the total anticipated torque requirement for the associated pump/function group, $T_{actual,A}$ is the torque requirement for the first pump 106 to supply fluid to drive the hydraulic functions 104 of Group A for the associated pump/function group, and $T_{actual,B}$ is the torque requirement for the second pump 108 to supply fluid to drive the hydraulic functions 104 of Group B for the associated pump/function group.

It should be appreciated that the calculations described above with reference to Equations 1-3 may be repeated to determine the total anticipated torque requirement for each pump-function combination. For instance, referring to Table 1 above, the calculations may be repeated sixty-four times to establish the total anticipated torque requirement for operating the pumps 106, 108 for each of the sixty-four different pump-function combinations.

As shown in FIG. 3, at (210), a desired pump/function combination of the various different pump/function combinations may be identified or selected. Specifically, in several embodiments, the computing system 120 may be configured to select the pump/function combination that has the lowest power parameter requirement (e.g., the lower torque torque requirement, $T_{total}$) as the desired pump/function combination. In other words, the computing system 120 selects (at least initially) the pump/function combination that requires the least amount of power input into the pumps 106, 108, thereby allowing system efficiency to be maximized.

At (212), following the identification of the desired pump/function combination, the method 200 may, at (212) include assessing the anticipated pump operation tinder the desired pump/function combination to determine if any of the pumps will be saturated. Specifically, in several embodiments, the computing system 120 may be configured to assess whether flow saturation will be introduced on one of the pumps 106, 108 using the desired pump/function combination such that the functional flow requirements cannot be satisfied. If there are no saturation issues, the computing system 120 may simply maintain the desired pump/function combination as is. However, if low saturation will be introduced, the computing system 120 will identify a new "desired pump/function combination" as the pump/function combination having the next lowest total torque requirement ($T_{total}$). The pump operation under this new pump/function combination will then be assessed for pump saturation in the same manner, with such pump/function combination being set as the desired pump/function combination if no saturation will exist. However, if flow saturation will again be introduced with this new pump/function combination, the computing system 120 will again identify a new "desired pump/function combination" as the pump/function combination having next lowest power parameter requirement (e.g., the next lowest total torque requirement, $T_{total}$), with the process described above being repeated until a suitable pump/function combination is determined that does not introduce flow saturation It should be appreciated that, in several embodiments, the computing system 120 may be configured to assess the potential for flow saturation using the fractional pump displacement ($\alpha$) previously calculated for each pump 106, 108 (e.g., using Equation 1). For instance, in one embodiment, the computing system 120 may be configured to determine that flow saturation will be introduced if the fractional pump displacement ($\alpha$) for either pump 106, 108 is equal to one. Similarly, the computing system 120 may be configured to determine that flow saturation will not be introduced if the fractional pump displacement ($\alpha$) for both pumps 106, 108 is less than one. It should be appreciated that, in other embodiments, the computing system 120 may be configured to assess the potential for flow saturation using any other suitable methodology or means.

Referring still to FIG. 3, at (214), the method 200 includes assessing the operating margin or efficiency associated with switching the previously implemented "desired pump/function combination" determined during the last processing cycle ($ID_{previous}$) to the newly identified "desired pump/function combination" deriving from the present processing cycle ($ID_{New}$), such as the newly identified "desired pump/function combination" deriving from method element (212). For instance, an exemplary process flow 400 for assessing the operating margin associated with switching pump/function combinations is illustrated in FIG. 5.

Figure 5:
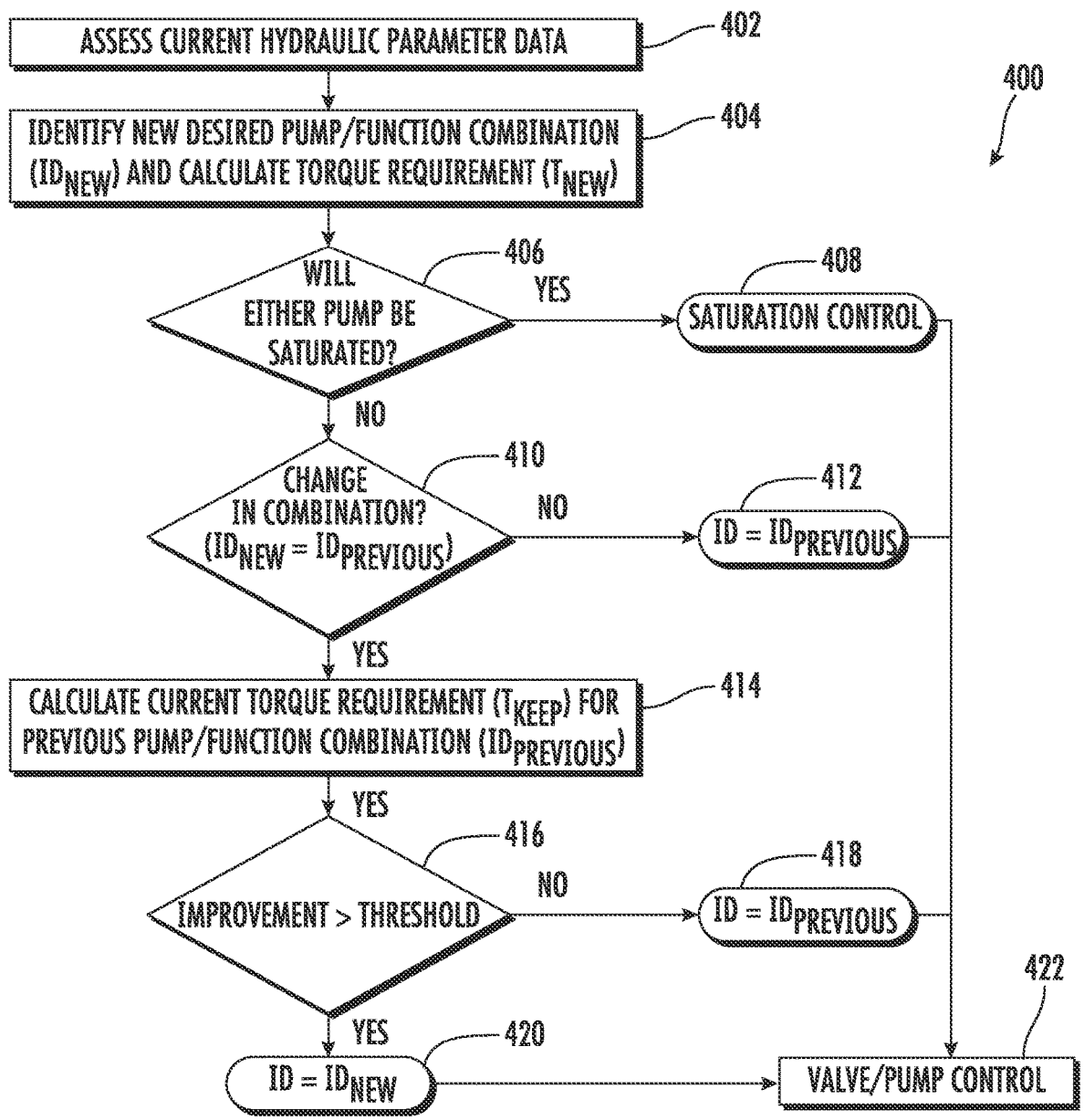
FIG. 5 illustrates an exemplary process flow for assessing the operating margin associated with switching pump/function combinations in accordance with aspects of the present subject matter.

As shown in FIG. 5 at (402), (404), (406), and (408), similar logic may be executed or applied as that described above with reference to method elements (202)-(212) shown in FIG. 3. For instance, at (402), the computing system 120 may be configured to access the current hydraulic parameter data for the system 100 (e.g., current pressure and flow rate data). Using such data, at (404), the computing system 120 may be configured to identify a desired pump/function combination ($ID_{New}$) and associate such pump/function combination with its power parameter requirement (e.g., its total torque requirement, $T_{New}$) similar to that described above with reference to method elements (208) and (210) shown in FIG. 3. At (406), the computing system 120 may be configured to apply the logic described above with reference to method element (212) shown in FIG. 2 to assess whether either pump 106, 108 will be flow-saturated. If one of the pumps 106, 108 will be saturated, the process described above with reference to method element (212) will be followed to determine a new pump/function combination to be implemented within the system 100 (e.g., as indicated at (408) in FIG. 5).

If neither pump 106, 108 will be saturated using the newly identified pump/function combination ($ID_{New}$), at (410), the computing system 120 determines whether the new pump/function combination ($ID_{New}$) is the same as the previously implemented pump/function combination ($ID_{previous}$). If so, the computing system 120 will simply, at (412), set the desired pump/function combination as the previously implemented pump/function combination ($ID_{previous}$). However, if the new pump/function combination ($ID_{New}$) differs from the previously implemented pump/function combination ($ID_{previous}$), the computing system 120, at (414), is configured to calculate a current power parameter requirement (e.g. a current torque requirement, Tkeep) for the previously implemented pump/function combination (ID$_{previous}$) using the current hydraulic parameter data (e.g., the current pressure md flow rate data accessed at (402)). For instance, such power parameter requirement can be calculated as described above using Equations 1-3.

By calculating the current power parameter requirement for the previously implemented pump/function combination (ID$_{previous}$) using the current hydraulic parameter data, the computing system 120 may, at (416), be configured to assess whether any improvement or gain will be achieved by switching from the previously implemented pump/function combination (ID$_{previous}$) to the newly identified pump/function combination (ID$_{New}$). For instance, the computing system 120 may be configured to compare the torque requirement (T$_{New}$) for the new pump/function combination (ID$_{New}$) to the torque requirement (T$_{keep}$) for the previously implemented pump/function combination (ID$_{previous}$) to determine whether the percent improvement or gain to be achieved exceeds a given threshold. If the percent improvement or gain to be achieved by making the switch does not exceed the threshold, the computing system will, at (418), set the desired pump/function combination as the previously implemented pump/function combination (ID$_{previous}$). However, if the percent improvement or gain to be achieved by making the switch will in fact exceed the threshold, the computing system 120 will, at (420), set the desired pump/function combination as the new pump/function combination (ID$_{New}$). Such logic can prevent the system 100 from becoming unstable by only allowing combination switches to occur if a given amount of system improvement or efficiency gain can be achieved.

It should be appreciated that, in one embodiment, the percent improvement between the new pump/function combination (ID$_{New}$) and the previously implemented pump/function combination (ID$_{previous}$) can be calculated using the relationship shown below (Equation 4). In such instance, the percent improvement calculated using Equation 4 may be compared to a predetermined percentage threshold (e.g., 10%) for implementing the logic at (416).

$$PI = \frac{(T_{Keep} - T_{New})}{T_{Keep}} * 100 \qquad (4)$$

wherein, P1 is the percent improvement, T$_{keep}$ is the current torque requirement for the previously implemented pump/function combination (ID$_{previous}$) using the current hydraulic parameter data, and T$_{New}$ is the current torque requirement for the new pump/function combination (ID$_{New}$) using the current hydraulic parameter data.

As shown in FIG. 5, once the pump/function combination to be implemented during the current processing cycle is determined, the computing system 120 may, at (422), be configured to control the switching valves and pumps in accordance with the desired pump/function combination. Such control will generally be described below with reference to the method 200 of FIG. 3.

Referring back to FIG. 3, at (216), the method 200 includes controlling the switching valves and pumps in accordance with the desired pump/function combination. Specifically, upon identification of the desired pump/function combination, the computing system 12 may be configured to control the switching valves 116 to ensure that the hydraulic fluid driving the various hydraulic functions 104 is supplied from the appropriate pump 106, 108 in accordance with the pump/function combination. For instance, referring briefly back to FIG. 2, if the desired pump/function combination indicates that the first, second, and sixth hydraulic functions 104 (e.g., Function #1, Function #2, and Function #6) are to be driven with fluid suppled from the first pump 106 and the third, fourth, and fifth hydraulic functions 104 (e.g., Function #3, Function #4, and Function #5) are to be driven with fluid suppled from the second pump 108, the computing system 120 may be configured to actuate the switching valves 116, as necessary, to execute such combination. Specifically, assuming all of the switching valves 116 are initially at their neutral positions, the computing system 120 will only need to activate or actuate the switching valve 116 associated with the sixth hydraulic function 104 (e.g., Function #6) to allow the first, second, and sixth hydraulic functions 104 (e.g., Function #1. Function #2, and Function #6) to be driven with fluid suppled from the first pump 106 since the switching valves 116 associated with the first and second hydraulic functions 104 (e.g., Function #1 and Function #2) are fluidly coupled to the first pump 106 in their neutral state. Similarly, assuming again that all of the switching valves 116 are initially at their neutral positions, the computing system 120 will only need to activate or actuate the switching valve 116 associated with the third hydraulic function 104 (e.g., Function #3) to allow the third, fourth, and fifth hydraulic functions 104 (e.g., Function #3, Function #4, and Function #5) to be driven with fluid suppled from the second pump 108 since the switching valves 116 associated with the fourth and fifth hydraulic functions 104 (e.g., Function #4 and Function #5) are fluidly coupled to the second pump 108 in their neutral state.

Additionally, the computing system 120 may be configured to control the pumps 106, 108 in accordance with the selected pump/function combination. Specifically, the computing system 120 may be configured to control the operation of the pump 106, 108 such that each pump 106, 108 provides hydraulic fluid at the delivery pump pressure calculated for such pump 106, 108 (e.g., at (310) in FIG. 4). As such, the delivery pump pressure supplied by each pump 106, 108 will incorporate the pressure margin calculated as a function of the total flow requirement for the various hydraulic functions 104 associated with such pump 106, 108, thereby ensuring that sufficient fluid pressures are provided to account for system losses (e.g. throttling losses).

It should be appreciated that the method 200 shown in FIG. 3 has generally been described herein as a dynamic grouping method in which the pump/function combination being implemented can be dynamically adjusted based on changing hydraulic system requirements. In other embodiments, a static grouping method can be executed by only implementing a portion of the method elements described above with reference to FIG. 3. In such embodiments, as opposed to dynamically identifying the desired pump/function combination each processing cycle (e.g., every 5 seconds), a desired pump/function combination can be identified (e.g., using average pressure and flow rate levels for the duty cycle of interest) and subsequently maintained by the system 100.

For example, in one embodiment, a static grouping method may include receiving an input associated with performing an operation with an agricultural implement during which hydraulic fluid will be used to drive a plurality of hydraulic functions of the agricultural implement. For instance, an operator may be configured to provide an operator input into the computing system 120 associated with the performance of an operation with an agricultural implement, such an operator input selecting or indicating a given operation to be performed within the field using the agricultural implement or a given set of requirements to be applied when performing an operation within the field.

Additionally, the static grouping method may include selecting a desired pump/function combination of a plurality of different pump/function combinations based at least in part on the input. For instance, in one embodiment, the computing system 120 may be configured to select the desired pump/function combination of the various available pump/function combinations based on the input received from the operator. As an example, the computing system 120 may include a look-up table or other data table that correlates different agricultural operations (or different requirements for specific agricultural operations) with a corresponding pump/function combination. In such instance, based on the input received, the computing system 120 may be configured to select the desired pump/function combination.

Moreover, the static grouping method may include controlling an operation of a plurality of switching valves such that the hydraulic fluid is configured to be supplied for driving the plurality of hydraulic functions in accordance with the desired pump/function combination. Specifically, similar to the method element (216) described above, the computing system 12 may be configured to control the switching valves 116 to ensure that the hydraulic fluid driving the various hydraulic functions 104 is supplied from the appropriate pump 106, 108 in accordance with the selected pump/function combination.

It is to be understood that, in several embodiments, the steps of the methods 200, 300, 400 are performed by the computing system 120 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the computing system 120 described herein, such as the methods 200, 300, 400, are implemented in software code or instructions which are tangibly stored on a tangible computer readable medium. The computing system 120 loads the software code or instructions via a direct interface with the computer readable medium or via a wired and/or wireless network. Upon loading and executing such software code or instructions by the computing system 120, the computing system 120 may perform any of the functionality of the controller 202 described herein, including any steps of the methods 200, 300, 400, described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for grouping hydraulic functions associated with an agricultural implement, the method comprising:

accessing, with a computing system, hydraulic parameter data associated with hydraulic fluid used to drive a plurality of hydraulic functions of the agricultural implement, the hydraulic fluid driving each hydraulic function of the plurality of hydraulic functions being supplied from one of at least two pumps;

determining, with the computing system, delivery pump pressures for the at least two pumps for each of a plurality of different pump/function combinations based at least in part on the hydraulic parameter data;

determining, with the computing system, a power parameter requirement for the at least two pumps for each of the plurality of different pump/function combinations based at least in part on the delivery pump pressures;

selecting, with the computing system, a desired pump/function combination of the plurality of different pump/function combinations based at least in part on the power parameter requirement; and controlling, with the computing system, an operation of a plurality of switching valves such that the hydraulic fluid is supplied for driving the plurality of hydraulic functions in accordance with the desired pump/function combination, wherein each of the plurality of switching valves is configured to control which of the at least two pumps supplies the hydraulic fluid for driving a respective hydraulic function of the plurality of hydraulic functions.

2. The method of claim 1, wherein accessing the hydraulic parameter data comprises accessing pressure data and flow rate data associated with the hydraulic fluid being supplied to drive the plurality of hydraulic functions.

3. The method of claim 1, further comprising controlling an operation of the at least two pumps based on the delivery pump pressures associated with the desired pump/function combination.

4. The method of claim 1, wherein the at least two pumps comprises a first pump and a second pump and wherein determining the anticipated delivery pump pressures comprises, for each respective pump/function combination of the plurality of different pump/function combinations:

determining a first maximum pressure for a first group of hydraulic functions of the plurality hydraulic functions associated with the first pump for the respective pump/function combination and a second maximum pressure for a second group of hydraulic functions of the plurality of hydraulic functions associated with the second pump for the respective pump/function combination;

determining a first pressure margin for the first pump to supply the hydraulic fluid to drive the first group of hydraulic functions and a second pressure margin for the second pump to supply the hydraulic fluid to drive the second group of hydraulic functions; and determining a first delivery pump pressure for the first pump based on the first maximum pressure and the first pressure margin and a second delivery pump pressure for the second pump based on the second maximum pressure and the second pressure margin.

5. The method of claim 4, wherein determining the first and second pressure margins comprises:
   determining a first flow rate requirement for the first group of hydraulic functions;
   determining a second flow rate requirement for the second group of hydraulic functions; and
   determining the first pressure margin as a function of the first flow rate requirement and second pressure margin as a function of the second flow rate requirement.

6. The method of claim 1, wherein the at least two pumps comprises a first pump and a second pump and wherein determining the power parameter requirement comprises, for each respective pump/function combination of the plurality of different pump/function combinations:
   determining a first torque requirement for the first pump based at least in part on the delivery pump pressure for the first pump;
   determining a second torque requirement for the second pump based at least in part on the delivery pump pressure for the second pump; and
   determining the power parameter requirement based on the first and second torque requirements.

7. The method of claim 1, wherein selecting the desired pump/function combination comprises:
   identifying which pump/function combination of the plurality of different pump/function combinations is associated with a lowest power parameter requirement; and
   selecting the pump/function combination with the lowest power parameter requirement as the desired pump/function combination.

8. The method of claim 1, further comprising determining whether any of the at least two pumps will experience flow saturation while supplying the hydraulic fluid to drive the plurality of hydraulic functions in accordance with the desired pump/function combination.

9. The method of claim 8, further comprising, when it is determined that one of the at least two pumps will experience flow saturation, selecting a new desired pump/function combination of the plurality of different pump/function combinations based at least in part on the power parameter requirement.

10. The method of claim 1, further comprising comparing the power parameter requirement for the desired pump/function combination to a power parameter requirement associated with maintaining a previously implemented pump/function combination of the plurality of different pump/function combinations,
   wherein controlling the operation of the plurality of switching valves comprises controlling the operation of the plurality of switching valves such that the hydraulic fluid is supplied to drive the plurality of hydraulic functions in accordance with the desired pump/function combination only when the power parameter requirement for the desired pump/function exceeds the power parameter requirement associated with maintaining the previously implemented pump/function combination by a threshold amount.

11. A system for grouping hydraulic functions associated with agricultural implements, the system comprising:
   an agricultural implement configured to execute a plurality of hydraulic functions;
   a work vehicle configured to tow the agricultural implement and supporting a hydraulic sub-system, the hydraulic sub-system including at least two pumps configured to supply pressurized hydraulic fluid and a plurality of valve assemblies, each valve assembly of the plurality of valve assemblies being configured to regulate the supply of the pressurized hydraulic fluid used to drive a respective hydraulic function of the plurality of functions, the hydraulic sub-system further including a plurality of switching valves, with each of the plurality of switching valves being configured to control which of the at least two pumps supplies the pressurized hydraulic fluid to a respective valve assembly of the plurality of valve assemblies; and
   a computing system provided in association with at least one of the work vehicle or the agricultural implement, the computing system being configured to:
      access hydraulic parameter data associated with the pressurized hydraulic fluid used to drive the plurality of hydraulic functions of the agricultural implement;
      determine delivery pump pressures for the at least two pumps for each of a plurality of different pump/function combinations based at least in part on the hydraulic parameter data;
      determine a power parameter requirement for the at least two pumps for each of the plurality of different pump/function combinations based at least in part on the delivery pump pressures;
      select a desired pump/function combination of the plurality of different pump/function combinations based at least in part on the power parameter requirement; and
      control the operation of the plurality of switching valves such that the pressurized hydraulic fluid is supplied for driving the plurality of hydraulic functions in accordance with the desired pump/function combination.

12. The system of claim 11, wherein the hydraulic parameter data comprises pressure data and flow rate data associated with the pressurized hydraulic fluid used to drive the plurality of hydraulic functions.

13. The system of claim 11, wherein the computing system is further configured to control an operation of the at least two pumps based on the delivery pump pressures associated with the desired pump/function combination.

14. The system of claim 12, wherein the at least two pumps comprises a first pump and a second pump and wherein the computing system is configured to determine the anticipated delivery pump pressures by, for each respective pump/function combination of the plurality of different pump/function combinations:
   determining a first maximum pressure for a first group of hydraulic functions of the plurality hydraulic functions associated with the first pump for the respective pump/function combination and a second maximum pressure for a second group of hydraulic functions of the plurality of hydraulic functions associated with the second pump for the respective pump/function combination;
   determining a first pressure margin for the first pump to supply the pressurized hydraulic fluid to drive the first group of hydraulic functions and a second pressure margin for the second pump to supply the pressurized hydraulic fluid to drive the second group of hydraulic functions; and
   determining a first delivery pump pressure for the first pump based on the first maximum pressure and the first pressure margin and a second delivery pump pressure for the second pump based on the second maximum pressure and the second pressure margin.

15. The system of claim 6, wherein the computing system is configured to determine the first and second pressure margins by:
- determining a first flow rate requirement for the first group of hydraulic functions;
- determining a second flow rate requirement for the second group of hydraulic functions; and
- determining the first pressure margin as a function of the first flow rate requirement and second pressure margin as a function of the second flow rate requirement.

16. The system of claim 11, wherein the at least two pumps comprises a first pump and a second pump and wherein the computing system is configured to determine the power parameter requirement by, for each respective pump/function combination of the plurality of different pump/function combinations:
- determining a first torque requirement for the first pump based at least in part on the delivery pump pressure for the first pump;
- determining a second torque requirement for the second pump based at least in part on the delivery pump pressure for the second pump; and
- determining the power parameter requirement based on the first and second torque requirements.

17. The system of claim 11, wherein the computing system is configured to select the desired pump/function combination by:
- identifying which pump/function combination of the plurality of different pump/function combinations is associated with a lowest power parameter requirement; and
- selecting the pump/function combination with the lowest power parameter requirement as the desired pump/function combination.

18. The system of claim 11, wherein the computing system is further configured to determine whether any of the at least two pumps will experience flow saturation while supplying the pressurized hydraulic fluid to drive the plurality of hydraulic functions in accordance with the desired pump/function combination,
- wherein, when it is determined that one of the at least two pumps will experience flow saturation, the computing system is configured to select a new desired pump/function combination of the plurality of different pump/function combinations based at least in part on the power parameter requirement.

19. The system of claim 11, wherein the computing system is further configured to compare the power parameter requirement for the desired pump/function combination to a power parameter requirement associated with maintaining a previously implemented pump/function combination of the plurality of different pump/function combinations,
- wherein the computing system is configured to control the operation of the plurality of switching valves such that the pressurized hydraulic fluid is supplied to drive the plurality of hydraulic functions in accordance with the desired pump/function combination only when the power parameter requirement for the desired pump/function exceeds the power parameter requirement associated with maintaining the previously implemented pump/function combination by a threshold amount.

* * * * *